United States Patent

Chen

[11] Patent Number: 6,073,881
[45] Date of Patent: Jun. 13, 2000

[54] AERODYNAMIC LIFT APPARATUS

[76] Inventor: Chung-ching Chen, 116 Batten Rd., P.O. Box 301, Croton-on-Hudson, N.Y. 10520

[21] Appl. No.: 09/135,746

[22] Filed: Aug. 18, 1998

[51] Int. Cl.[7] .............................. B64C 29/00; B64C 39/00
[52] U.S. Cl. .......................................... 244/23 C; 244/207
[58] Field of Search ................. 244/12.2, 12.3, 244/23 B, 23 C, 73 C, 207

[56] References Cited

U.S. PATENT DOCUMENTS

| | | | |
|---|---|---|---|
| 2,726,829 | 12/1955 | Hillis | 244/12.2 |
| 2,801,058 | 7/1957 | Lent | 244/12.2 |
| 3,697,020 | 10/1972 | Thompson | 244/207 X |
| 3,785,592 | 1/1974 | Kerruish | 244/12 C |
| 4,566,699 | 1/1986 | Cucuzza | 244/12.2 |
| 4,674,708 | 6/1987 | del Castillo | 244/12.2 |
| 5,031,859 | 7/1991 | Cunningham | 244/12.1 |
| 5,046,685 | 9/1991 | Bose | 244/23 C |
| 5,054,713 | 10/1991 | Langley et al. | 244/12.2 |
| 5,170,963 | 12/1992 | Beck, Jr. | 244/12.2 |
| 5,203,521 | 4/1993 | Day | 244/12.2 |

*Primary Examiner*—Robert P. Swiatek

[57] ABSTRACT

A lift apparatus using the method of blowing air over the upper surface of the apparatus to generate lift by virtue of the balance of outside pressures against the body of the apparatus. It does this by using the expansion characteristic of supersonic gas stream in a divergent space to create low pressure above the upper surface and to maintain the attachment of the stream to the surface. For power source, it uses the hybrid internal combustion engine of a co-pending invention in its jet operation mode to jet the air. And it solves the working substance supply problem by recycling.

6 Claims, 3 Drawing Sheets

AERODYNAMIC LIFT APPARATUS

CROSS REFERENCE TO RELATED APPLICATIONS

The present application has a related co-pending application entitled "hybrid internal combustion engine" of application Ser. No. 09/059,037 filed on Apr. 13, 1998, which is originally intended to be part of the present application but for sake of better division and its own independent applicability is hence filed separately.

BACKGROUND OF THE INVENTION

1. Field of the Invention

The present invention relates to an aerodynamic lift apparatus and a high pressure jet engine therefor, more particularly it relates to such an apparatus and said engine which is declared in my co-pending invention entitled "hybrid internal combustion engine", both having the major application in vertical-takeoff-and-landing (VTOL) aircraft.

2. Description of the Prior Art

Air transportation, with its three dimensional movement, is inherently superior than surface transportation. To get to the third, the vertical, dimension, gravitational pull needs to be overcome, in other words, a lift force is needed. The direct way to do this is by propulsion, such as using the gas exhaust thrust of a jet or rocket engine. The indirect way is by air floatation, such as airships, utilizing the fact that everything on and above the surface of earth is immersed in an air mass, the atmosphere. Winged (fixed or rotary) aircraft use a third way, i.e. by the lift force produced from the difference of pressures against the upper and lower surfaces of an airfoil (wing or rotary blade) during its rapid motion in the air pursuant to the Bernoulli principle.

All three ways have advantages and disadvantages. The first one, the propulsion method, is straightforward to achieve but needs large engine power to produce the required thrust. The second one, the floatation method, is cheap in energy cost but needs either a large body to carry enough volume of a light weight gas as in airships or a large airfoil to contain large volume of air as in motorized gliders, hence limiting its performance. The third one, the airfoil lift method, is the practical one due to its better lift-to-weight ratio, but it needs a high speed of the airfoil relative to the ambient air to effect enough pressure difference. Because of the need for this high speed, aircraft using the airfoil lift method, as almost all the contemporary fixed-wing aircraft do, suffer greatly from many disadvantages stemming from this requirement, especially during takeoff and landing, such as those in terms of safety, noise and structural weakness in the wings, as well as other associated disadvantages such as need of long runway and hence airport, fuselage shape constraint, etc.

Various methods have been devised in one way or another to mix or to combine some forms of these three methods in an attempt to achieve the optimal solution for the vertical movement, especially during takeoff and landing, they thus fall under the category of VTOL aircraft. A large group of the VTOL solutions focus on modifying, improving, or augmenting the rotary wing aircraft, commonly known as helicopters. This is not surprising since they are the main VTOL aircraft in commercial application, but they have the major disadvantages of low performance in terms of speed, payload, stability, safety, maneuverability, altitude and drag, and other related disadvantages such as noise, mechanical complication, high costs of manufacturing and maintenance, etc., almost all due to the propeller (commonly called rotor in helicopter application) lift system it uses, including the need for a tail rotor to counter the torque generated by the main rotor.

The three methods, either alone or in combination, with current state of the art, have not solved the VTOL problem in a commercially viable manner. Therefore, other forces are being explored, one is the airfoil lift force produced in a reverse manner. It is mentioned heretofore that this force is generated on the airfoil through its motion relative to the air pursuant to the Bernoulli principle. Since this motion is a relative one, either that the airfoil moves against the air, or vice versa, can produce the lift. Accordingly, a large group of VTOL (or STOL, S stands for 'short', meaning short takeoff distance) solutions focus on generating or blowing air streams around the airfoil to produce (or enhance) the pressure difference, hence the lift. U.S. Pat. No. 5,203,521 to Day (1993), U.S. Pat. No. 5,170,963 to Beck (1992), U.S Pat. No. 5,046,685 to Bose (1991) U.S. Pat. No. 3,785,592 to Kerruish (1974) and U.S. Pat. No. 2,801,058 to Lent (1957) all show a VTOL aircraft with the method of blowing air streams around airfoils.

If the airfoil method is to be used satisfactorily in the above-mentioned manner, enough quantity and velocity of the air stream need to be generated to blow around the airfoil in a way such that substantial pressure difference is created therewith. Although the motion involving the airfoil and the ambient air is a relative one, but for the case of an airfoil moving against the air, as winged aircraft does, the Bernoulli theorem is applied by simply drawing an imaginary closed body fully enclosing the airfoil. On the other hand, for the case of air moving against an airfoil, if the Bernoulli theorem is to be likewise applied, the quantity of the air needs to be such that the airfoil is entirely immersed in the moving air stream. This means that the power source needs to have the capacity to supply this quantity of air mass—called working substance (WS) to differentiate it from air used as fuel—the rate of which is proportional to the velocity of the air stream and to the cross-sectional area of the airfoil. Since the magnitude of the lift generated by the airfoil is generally proportional to the square of this velocity, the larger the lift is required, the higher the velocity must be, and the more WS is needed. The US patents cited above do not teach how to generate such enough amount of WS and hence do not show whether the magnitude of the lift is commercially significant.

Clearly, blowing air around an airfoil doesn't seem a practical method to generate commercially significant lift force: it needs not only a powerful engine, the same problem for the propulsion method, but also a large amount of air (the WS) for this purpose, this air supply problem being even not addressed in prior arts. However, a closer examination of the two pressures at the upper and lower surfaces of an aircraft wing reveals a useful fact: the pressure under the airfoil roughly equals the ambient air pressure and it is the lower-than-atmospheric pressure at the upper surface which contributes mostly the pressure difference. Accordingly, if there can exist a lower-than-atmospheric pressure above the surface of a body which needs not to be in the shape of an airfoil, then a lift force will be produced on the body by the balance of pressure against the body—call it pressure force for reference, hence the method of using it the pressure force method, since airfoil is not relevant now.

U.S. Pat. No. 5,054,713 to Langley et al. (1991), U.S. Pat. No. 5,031,859 to Cunningham (1991), U.S. Pat. No. 4,674,708 to del Castillo (1987), U.S. Pat. No. 4,566,699 to Cucuzza (1986), U.S. Pat. No. 3,697,020 to Thompson (1972) and U.S. Pat. No. 2,726,829 to Hillis (1955) seek to use this method, but the geometries of their upper surfaces do not clearly show the existence of the lower pressure and how it is maintained, and they do not address and hence solve the WS supply problem. Except U.S. Pat. No. 3,697,020, the other five patents do not specifically refer to the pressure force phenomena despite the fact that they make the use of blowing gas streams over an upper surface. U.S. Pat. Nos. 5,054,713 and 2,726,829 have the bodies of their inventions intimately associated with a circular construction, and term their inventions as "circular" (wing) airplane. U.S. Pat. No. 5,031,859 refers to its invention as a thrust-producing device in its claims and elsewhere and teaches the method of "distributing . . . fluid . . . over and adjacent said surface for blanketing and enclosing . . . first stream" and "causing . . . first stream . . . unattached . . . to define a closed volume . . . " and then ". . . permitting . . . the first stream . . . to partially evacuate by entrainment the volume and to create a low pressure within the volume . . . " (see its abstract, paragraph two of column 2 of the specification, and claim 1)—this is a kind of pressure force method by entraining a volume of low pressure gas, which is not convincing as whether it will produce commercially significant lift force and whether it will work as described aerodynamically since no estimate of force magnitude is taught. Moreover, except for U.S. Pat. No. 3,697,020, the other five patents do not teach the use of supersonic flow and its aerodynamic expansion characteristic which are employed extensively in the present invention. Although U.S. Pat. No. 3,697,020 uses supersonic flow in a pressure force method, it does not use its expansion gas directly for forming the low pressure zone, instead it teaches the method with "The supersonically flowing gas separating and thereafter reattaching to the surface to provide a low pressure region intermediate the points of separation and reattachment" and "ambient gas trapped between the points of separation and reattachment [being] mixed with and entrained in the supersonic stream thereby creating a near vacuum . . . "—an entrainment method similar to that of patent U.S. Pat. No. 5,031,859. An additional important difference of the present invention is the use of an expansion space for the flow, which is produced by an increasing area of the flow front of a radial flow due to the front's increasing perimeter.

SUMMARY OF THE INVENTION

From the above description of the prior art, a commercially viable VTOL solution needs to address the following issues:

(a) The three methods—the propulsion method, the floatation method and the airfoil method—either alone or in combination, with current state of the art, do not provide the lift force with a magnitude equivalent at least to the gross weight of the aircraft in a commercially viable manner.

(b) Among them, the floatation method has its inherent weight vs. size shortcoming which limits its use to special applications.

(c) The propulsion method needs to be able to generate large thrust efficiently, for which the jet engine is the device of choice. The conventional jet engines, however, have many deficiencies, the foremost is the low fuel efficiency. An implicit shortcoming of the conventional jet engines is the way air is used both as part of the fuel to provide oxygen for combustion and, after combustion, as the WS constituting the thrust gas, whence there is a mismatch between the quantities required by these two uses, resulting in the low fuel efficiency and the need for large amount of air intake. Another shortcoming inherent with the conventional jet engines is the large amount of energy wasted as heat and momentum carried by the exhaust gas. Compounding this shortcoming is the fact that these engines generate thrust by first imparting thermal energy to the WS which then converts part of it into kinetic energy. Thereby more thrust needs, hence wastes, more thermal energy. If these problems and shortcomings can be dealt with properly, a more efficient and powerful jet engine can be built and the lift due to the propulsion method will be greatly increased. However, with current state of the art, it is not foreseeable that such an engine will be invented soon so that with it the propulsion method alone solves the VTOL problem in a commercially viable way (Note that the AV-8A Harrier jet is an example of a VTOL aircraft using propulsion method alone but having limited military use only).

(d) The third force, i.e. by the airfoil lift method, is very promising but also very difficult to harness when utilized in the indirect way of blowing air against the airfoil. In the case of air flowing both over and beneath the airfoil, it is difficult to generate a sufficient pressure difference and hence a large airfoil lift force, since the airfoil needs to be completely immersed in the flow for the Bernoulli principle taking full effect and the conventional jet engines such as turbofan are unable to jet such a large amount of air.

(e) For the case of blowing air only over the upper surface of a body, i.e. using the pressure force method, besides the quantity and velocity requirements of the air stream, there is also a difficulty of maintaining the attachment of the air stream to the surface aerodynamically.

The present invention solves the VTOL problem by inventing a lift apparatus using the pressure force method of blowing air over the upper surface of the apparatus to generate lift. It does this by using the expansion characteristic of supersonic gas stream in a divergent space to create low pressure above the upper surface and to maintain the attachment of the stream to the surface. For power source, it uses the hybrid internal combustion engine of my co-pending invention in its jet operation mode to jet the air—the engine is actually invented for this purpose. And it solves the WS supply problem by recycling. In so doing the usually wasted energy in the form of heat and momentum carried in the engine's exhaust gas is able to be recovered. The novel high pressure jet engine of my co-pending invention is fuel efficient, simple to build and hence light weight, and having no front inlet requirement. More importantly, this engine is compression-oriented as compared with the conventional jet engine which is heat-oriented. This not only reduces the loss of thermal energy, but also suits the purpose of the present invention well, as explained hereinafter in connection with the preferred embodiment.

The magnitude of the lift produced by the pressure force method (and by the airfoil method in this regard) has a theoretical maximum which is simply the product of atmospheric pressure times the vertical projection of the area covered by the low pressure zone (or the area of the airfoil), expressed in per unit area it is roughly 10 metric ton per square meter. This happens when the low pressure zone reaches the vacuum state. In practice, the low pressure may be only 10 to 20 percent lower than the atmospheric pressure and it may not be evenly distributed. However, even a 10 percent reduction of pressure gives a force of one metric ton per square meter effective area. For reference, a Boeing 747 typically has a gross weight of 365 tons with a wing area of 511 square meter, which entails a lift of 0.714 ton per square meter, or a 7.14 percent reduction.

It is therefore the object of the present invention to provide a lift apparatus and a high pressure jet engine therefor, having the major application in using the apparatus to make a VTOL aircraft which will have the same capability as the fixed wing aircraft in performance and payload while being able to takeoff and land vertically.

It is another object of the present invention to provide a lift apparatus which uses the pressure force method of blowing air over the upper surface of the apparatus to generate lift, thereby making it simple to build, easy to maintain and safe to operate.

It is also another object of the present invention to provide a lift apparatus and a high pressure jet engine therefor, which recycle the WS after it flows over the upper surface of the lift apparatus and feed it back to the engine.

It is further object of the present invention to provide a lift apparatus and a high pressure jet engine of my co-pending invention therefor, in which air as part of the fuel is pressurized and supplied separately to the engine while air as WS is recycled continuously during the operation of the aircraft.

It is still another object of the present invention to provide a lift apparatus and a high pressure jet engine of my co-pending invention therefor, in which by recycling the exhaust gas of combustion together with the WS, the problem of jet striking the ground and kicking off particles during takeoff and landing is avoided.

It is yet another object of the present invention to provide a lift apparatus and a high pressure jet engine of my co-pending invention therefor, in which by recycling the exhaust gas with the WS the normal pollution caused by the exhaust gas can be controlled. Further, the quality and the composition of the WS can be maintained in accordance with the design requirement.

It is another object of the present invention to provide a lift apparatus and a high pressure jet engine therefor, in which by separating out and recycling the WS, the need for large amount of intaking air is greatly reduced and thus the problem of sucking in foreign object and damaging the engine is avoided.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENTS

Figure 1:
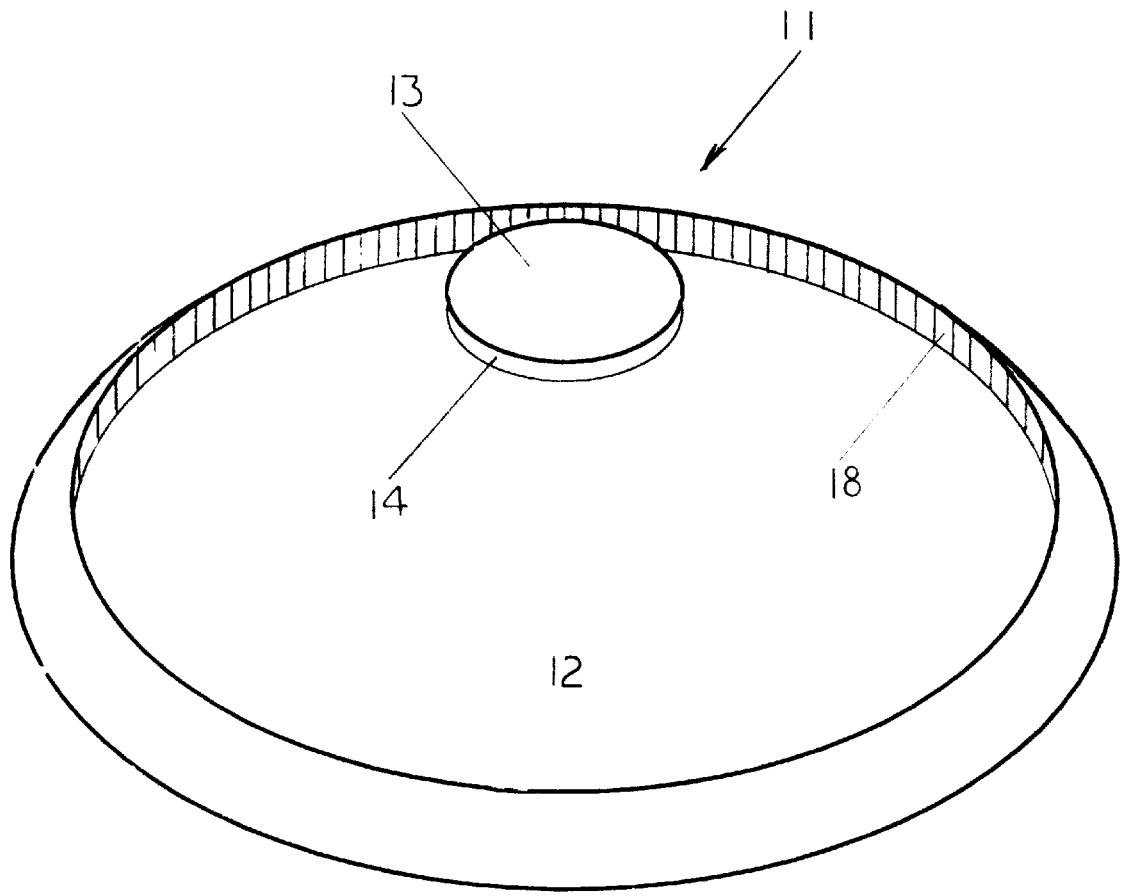
FIG. 1 is a perspective view of an aerodynamic lift apparatus of the present invention.

In the drawings, all structures are shown in generally diagrammatic form, details of auxiliary parts, large and small, of the apparatus and the engine system have been omitted as they are not relevant to the present invention and those skilled in the art can readily apply the disclosure herein to a particular application, while selecting those parts from existing technologies.

Figure 2:
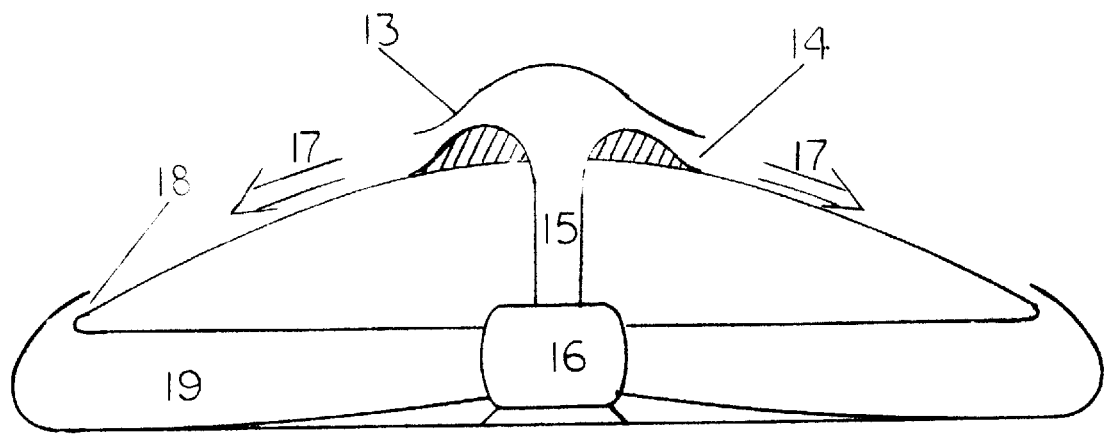
FIG. 2 is a sectional view of the apparatus of FIG. 1.

Description of the Drawings FIGS. 1 and 2

Referring now to the drawings wherein like reference numerals denote like parts or elements throughout. FIG. 1 is a perspective view of an aerodynamic lift apparatus of the present invention. There is shown a preferably circular shaped body 11. The advantage of adopting a circular, more generally radially symmetrical, body is its simplicity, especially to reduce an otherwise three dimensional problem to as simple as one dimensional. FIG. 2 is a sectional view of the body, with upper surface 12 having a convex curvature. Referring to both FIG. 1 and FIG. 2, there is a nozzle assembly 13 disposed at the top and in the middle of the upper surface, with an annular mouth 14 facing radially outward. The nozzle assembly is connected inside the body through duct 15 to a compressor 16 which supplies highly pressurized gas as the working substance (WS) to the nozzle assembly 13. The gas stream 17 exiting the nozzle mouth flows radially along the convex upper surface and then re-enters the body through a ring of protruding inlets 18 around the periphery of the body. The recovered WS first passes through some auxiliary devices such as filters (all not shown) and then enters the compressor through duct 19 to be re-pressurized for the continuing use by the nozzle, thus completing a cycle.

It should be noted that diffusers which are a common feature in conventional jet engines are not specifically employed in the present invention. As a matter of fact, it makes no sense in the present invention to employ a diffuser whose main function is to convert gas momentum into gas pressure, since the WS is continuously being cycled and hence no point to slow it down. However, for this purpose, the compressor needs to be able to pressurize the WS in its high speed motion—a turbine compressor. The engine of my co-pending invention responds to this need.

Description of the Basic Operations

Referring to FIG. 2, because of circular symmetry the following description is expressed as in two or even one dimension for convenience. For the jet stream 17 to create the desired lower-than-atmospheric pressure zone, the present invention takes the solution that the jet stream itself plays the role of supplying the low pressure gas, which differs from the other solution that the jet stream entraps or "entrains" another low pressure gas as in the prior art cited heretofore (see U.S. Pat. No. 5,031,859). To achieve this objective, i.e. making the jet stream become a low pressure gas aerodynamically, there are several conditions to be met. The first is that its exit pressure at the nozzle mouth 14 is preferably maintained at slightly above the atmospheric pressure. Too high a pressure will make it to expand away from the upper surface and hence part of it will not re-enter the peripheral inlets 18, thus creating a WS leakage problem. On the other hand, too low a pressure will reduce its effectiveness in extending the low pressure zone, worse it can create back flow and turbulence problems at the exit.

The second condition is that its exiting velocity should be above the local velocity of sound, the higher the better, and its direction should be such that an optimal aerodynamic attachment to the upper surface is achieved, roughly this direction is tangent to the upper surface at the exit. To create such a supersonic jet stream, the nozzle should be a convergent-divergent nozzle, i.e. a laval-type nozzle.

The third condition is that the space the jet stream enters is such that the supersonic jet stream will be able to expand, thereby reducing its pressure pursuant to aerodynamic principles and hence creating the desired low pressure zone. This embodiment of the present invention utilizes two available geometrical characteristics to meet this requirement. One is the radial flow from the annular nozzle, which offers an increasing perimeter at its flow front, thus providing the first, and the most useful, expansion dimension for the flow. Another is the convex curvature of the upper surface, which gives the flow a downward, thus one more, expansion dimension. However, the significance of the convexity is actually its role in maintaining and extending the attachment of the jet stream to the surface, which is also the fourth condition.

The fifth condition is that the width and the perimeter of the nozzle mouth 14 should be of optimal size. Too big a size will demand a big engine to supply and jet out the required air mass, i.e. the WS. Too small a size will reduce the extent of the low pressure zone.

From compressible flow theory of aerodynamics, these factors—the exit pressure, the supersonic exit velocity (generated by the laval-type nozzle) and its direction, the radial flow and the convex upper surface, and the width and the perimeter of the nozzle mouth—are all the principle ingredients of producing and maintaining a substantial low pressure zone above the upper surface. Furthermore, they also determine the extent of the low pressure zone and how low the pressure is. When the jet stream 17 exits from the laval type nozzle 13 at supersonic speed under these conditions, it starts to expand into this divergent space and thus reduces its pressure below the atmospheric pressure aerodynamically, meanwhile it is pushed by the atmosphere above and kept attached to the upper surface, whereby a low pressure zone is created and maintained there.

The atmospheric push counteracts the expanding jet stream until a point (call it the first inflection point; in three dimension view it is actually a surface of the flow front) is reached where the space starts to shrink, thereon the speed of the jet stream decreases and its pressure increases. When the jet pressure increases to the atmospheric pressure, a second point (call it the second inflection point; again in three dimension view this is actually a surface) is reached where the low pressure zone ends—this is the place where the re-entrance inlets 18 are disposed.

If the upper surface is flat, not convex, the first and second inflection points will be reached much sooner, hence a smaller low pressure zone is produced, thereby producing a smaller lift force. The convexity delays the reaching of the inflection points, thereby extends this zone and hence increases the lift force. It is true that convexity alone can produce this expansion effect and hence this kind of pressure force—advantage has been taken of in this regard in the prior art to enhance the lift of the aircraft wing, generally under the name of Coanda effect (which actually attacks the lift problem from the issue of stream attachment). Convexity, however, limits the extent of the surface, hence its value in producing the pressure force is inferior in comparison with the radial expansion. It also causes the lift body to have more height and to become bulky.

The design of the convex curvature of the upper surface follows the general procedure for the design of the laval nozzle, in particular to avoid or minimize the occurrence of shock waves which usually accompanies the supersonic flow.

Like in all engineering design, tradeoff has to be made. The first tradeoff is between the convexity of the surface and the height of the body. The second tradeoff, as mentioned heretofore, is between the width and the length of the perimeter of the nozzle mouth, i.e. its area size, and the mass flow rate of the jet stream, hence the power of the engine. Thirdly, while extending the low pressure zone is one way to produce more lift force, making the pressure as low as possible is, of course, another way. The tradeoff for achieving the later is again the requirement of more powerful engine.

For those who are interested in the theoretical aspect of the present invention, it is worth noting that there is a similarity between the operation of the low pressure zone and the Venturi effect used in some pump operations, the big difference is that now it is the "pump" which is being pulled. It will be easy to appreciate that there is a substantial induced flow of air in the adjacent atmosphere alongside the flow of the WS. For this reason, in employing the lift apparatus of the present invention, care needs to be taken to ensure that the induced flow is not obstructed in such a way that its effect will ripple back to affect the flow of the WS stream.

Adopting the Engine of My Co-pending Invention

As can be appreciated, the focus of the engine, together with the nozzle, in the present invention is to jet out a supersonic gas stream in sufficient amount which then expands to generate a low pressure zone, hence the engine is not thrust-force-oriented as conventional jet engine does. The hybrid internal combustion engine of my co-pending invention is invented to serve exactly this purpose when it is used in its jet operation mode.

The engine of my co-pending invention has additional advantages and features that fit the present invention well: it is a compressor-oriented jet engine; the compressor is turbine driven and hence works continuously; the gas being compressed, the WS, can have high input velocity and pressure (while conventional jet engine has to slow down this velocity by diffusion because the WS is also part of the fuel during combustion), and outputs after compression in higher velocity and pressure, thus greatly reduces the power consumption of the compressor and increases its efficiency; the WS comes not from the front inlet, as conventional jet engine does, but from recycling itself and hence front inlet pressure force of the conventional jet engine is also avoided; the WS is not burned to increase its temperature but compressed to increase its pressure, the jet stream therefore has a comparatively lower temperature than those from the conventional jet engines; and lastly the gas from burning remains of the combustion can be made to join directly with the WS and hence not only contributes to the jet stream but also is used (with filtering) to replenish the leaked out WS.

In FIG. 2, the compressor is drawn as being disposed in the center of the lift body, for illustration purpose. In practice, the compressor is preferably disposed as close to the nozzle mouth as possible, even to the extent as being integrated with the nozzle assembly, so as to minimize flow loss and to reduce the length of duct 15, thus reduce its weight since it needs to be built of heavy material to withstand high pressure. The engine of my co-pending invention can readily achieve this objective since it is relatively light weight, compact in size and capable to produce high pressure gas stream efficiently. It can also be used in a distributed way, i.e. it can be separated in smaller units and disposed to achieve optimal arrangement.

Figure 3:
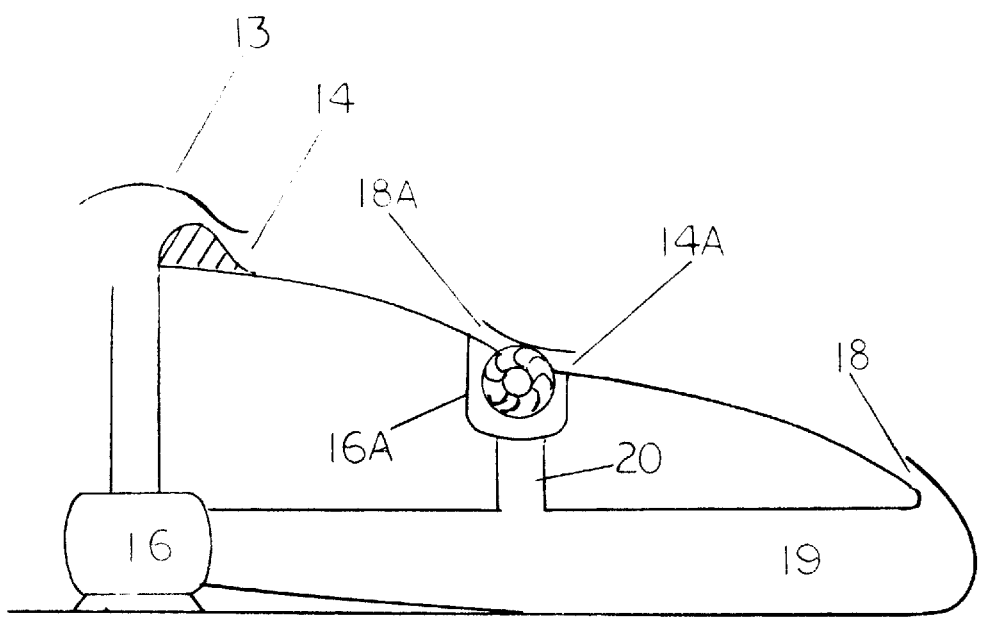
FIG. 3 is a half sectional view of an aerodynamic lift apparatus with its upper surface in two stages.

FIG. 3 and Multi-stage Improvement

The convexity of the upper surface of the lift body constrains its size as discussed heretofore. A multi-stage construction solves the problem—FIG. 3 shows the cross-section view of a two-stage construction, shown in half due to symmetry. Again, the engine of my co-pending invention is being used in this construction most advantageously, particularly its distributed usage discussed heretofore—in FIG. 3 the distributed use is around the perimeter of the first stage, where the recovering inlets 18A for the first stage are the input inlets of the compressor 16A for the second stage. It should be noted that, due to longer perimeter of the second stage nozzle mouth 14A, more than the re-entered amount of the WS is needed for the second stage nozzle operation, hence in FIG. 3 there is shown a duct 20 connected with the recycling duct 19 so as to share part of the recycled WS for the second stage compressor. Additionally, the height of the re-entrance inlets 18A can be raised so as to take in some of the atmosphere air to supplement the WS if necessary.

In the above description, the words 'compressor' and 'engine' are interchangeably used. This is now apparent considering the structure of the nozzle assembly which is conventionally associated with the compressor/engine, the distributed use of the compressor/engine, and the pressure-oriented character of the engine. Additionally, the drawings do not show the air supply used as fuel for the engine since its amount is comparatively smaller than the amount of the WS, hence it can be easily supplied through auxiliary means in connection with its specific application. After the WS is recovered through the protruding annular inlets 18, it can be made to pass through many auxiliary devices (all not shown), such as filtering device, pollution control device, quality control device, mixing device for additives, etc., in particular a storage device for storing the WS when the lift apparatus is not operating, especially if the WS has a composition different from air. The storage device can also function as a buffering device to reduce vibration caused by the power variation of the engine.

Figure 4:
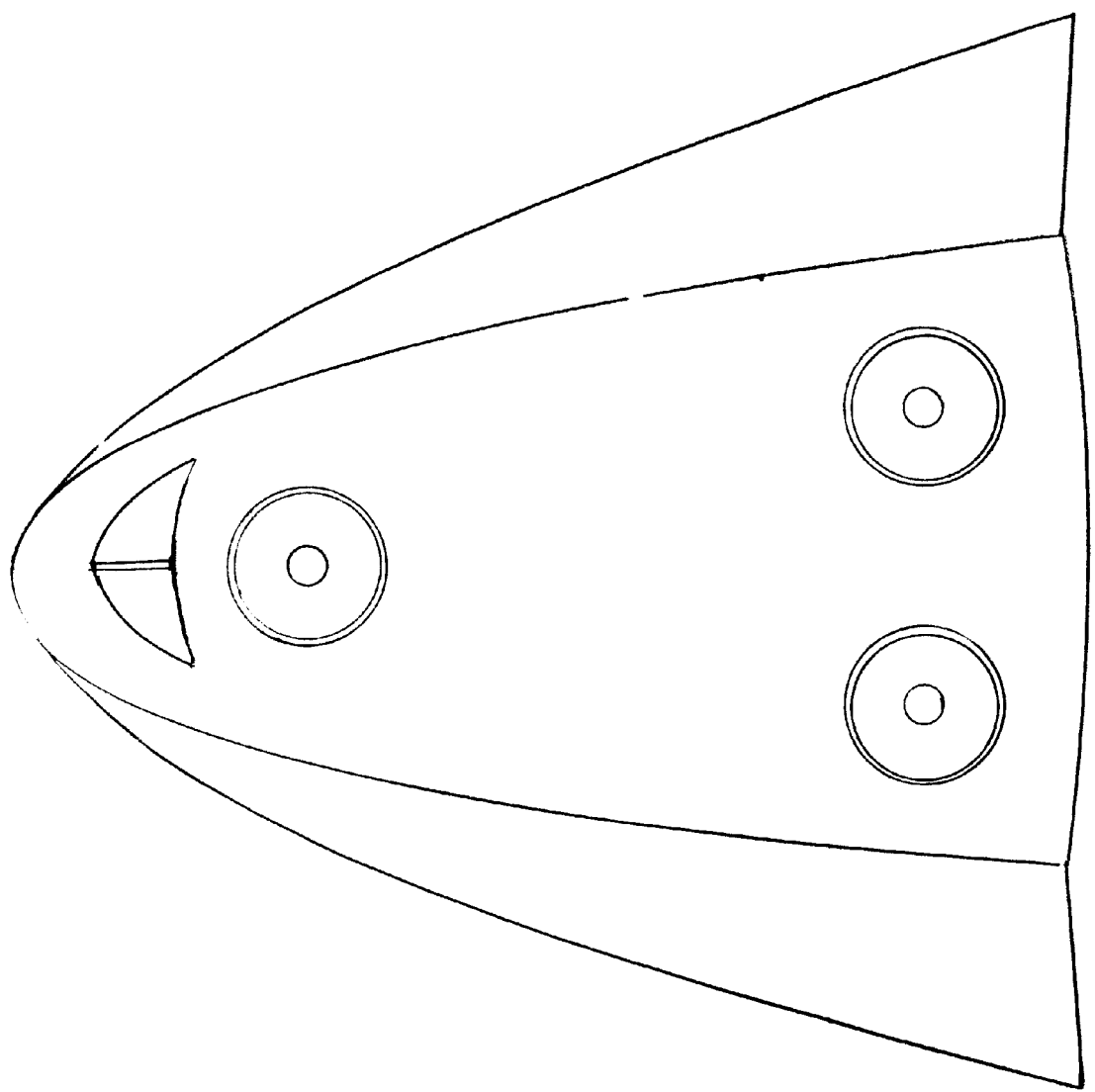
FIG. 4 shows a top view of a VTOL aircraft employing the present invention.

FIG. 4 and Applications

FIG. 4 shows the top view of a VTOL aircraft applying three lift apparatuses of the present invention, having an auxiliary delta wing design. It will be appreciated that one of the preferable way to provide the horizontal force of the aircraft is by way of altering the distribution of the gas stream of the lift body, such as selectively close off part of the nozzle mouth, selectively altering the pressure or the flow of the gas stream in some part of the nozzle, etc. This is so because in cruise flight the auxiliary wing will provide most of the lift and hence part of the engine power is better diverted to provide horizontal force. Keeping some of the lift force, however, will have the advantage of providing the aircraft with a dynamic stabilization force in turbulent weather conditions. It can also be seen that the VTOL aircraft employing the present invention has additional advantages, besides the vertical movement capability, such as the shape and structure of the aircraft body are free from the requirements of the wing structure. For small passenger size aircraft, such as one or two seaters, the shape of the aircraft is ideally circular, i.e. disk-shaped or saucer-shaped.

The lift apparatus itself can be used as a kind of air crane to be used in large scale construction which needs to transport oversize parts, materials, or equipment to site, or can be used to simply substitute cranes in special cases such as emergency lift, hard-to-set-up place for conventional cranes, mobile use, etc.

Another potential use is to serve as a mid-air platform for launching rockets or missiles. In this use, a multiple-units combination is used to increase load and stability.

Yet another potential use is to act as a general force device: the direction of the "lift" force does not have to be vertical; as long as the apparatus is immersed in the atmosphere, it can operate to produce force in any direction, even in downward direction. The title of the invention preserve the word "lift" to note its origin and its greatest application in VTOL aircraft.

Conclusion, Ramifications, and Scope

Accordingly, the reader will see that the aerodynamic lift apparatus of the present invention and the engine of my co-pending invention therefor can be used to solve the lift force problem in a commercially viable way: A VTOL aircraft applying the present invention not only sheds all the drawbacks associated with the rotor of the helicopter but also has the additional advantages in that, the role, the shape, the structure and the requirement of the traditional wing are changed: the role becomes a supplementary one providing stability and lift during cruise flight while shedding its lifting role during takeoff and landing; hence the shape can be designed flexibly, in most case surrounding the craft rather than protruding outward as the traditional wing does, and the structure can be as fixed or retractable according to the design objectives (in FIG. 4 the delta wing can be made retractable ), and furthermore the wing tip problems are thus easily avoidable or become minor; and the requirement of cantilever strength of the (auxiliary) wing is also immaterial or greatly reduced.

the shape of the fuselage is no longer bound by the need for the wing, hence more efficient use of space can be made and the overall size of the aircraft is more compact.

It is to be understood that the above description and attached drawings, although contain many specificities, should not be construed as limiting the scope of the invention but as merely setting forth a preferred form of my invention. For example, the shape of the lift body can have other shapes such as ellipsis or even fan shape, as long as it satisfies the requirement of providing a divergent space for the jet stream. Furthermore, the lift apparatus can be provided with force control means to alter the direction of the force, to regulate its magnitude, and to maintain the stability of the apparatus, such as by using the usual tools of fins, vanes, apertures, and holes on the surface and valves and vanes in the nozzle, as anyone skilled in the art will be able to do.

Thus the scope of the invention should be determined by the appended claims and their legal equivalents, rather than by the examples given.

I claim:

1. An aerodynamic force-producing apparatus with the associated force direction defined as the up direction, comprising:

(a) a body having an upper surface with respect to said up direction, and said upper surface having a predetermined geometry, a first periphery and a second periphery;

(b) convergent-divergent nozzle means disposed atop said upper surface along said first periphery for blowing a supersonic gas stream across said upper surface and together with said geometry of said upper surface for causing said gas stream to flow contiguously and without obstruction along said upper surface toward said second periphery;

(c) compressor means for imparting high pressure to a gas defined as working substance which constitutes a substantial part of said gas stream;

(d) working substance recycling means to collect and prepare for re-use the gas of said gas stream, said recycling means comprising inlet means disposed along said second periphery of said upper surface and protruding a predetermined height to receive said gas stream and conduit means for connecting said inlet means to said compressor means and said compressor means to said nozzle means;

(e) said gas stream having a flow front bounded at one side by said upper surface and at the other side by the atmosphere, thereby defining the upper and lower boundary lines of said flow front as the intersection lines between said flow front and said upper and lower boundaries respectively and defining the thickness of said flow front as the distance between the two boundary lines;

(f) said flow front first having an increasing area and then having a decreasing area, said increasing area being caused by the increasing lengths of at least one of said lower boundary line and said thickness due to said geometry of said upper surface, and said decreasing area being caused by the decreasing length of said thickness due to atmospheric push;

(g) said increasing area of said flow front causing said gas stream to expand aerodynamically, thereby reducing its pressure and blanketing a first portion of said upper surface with said gas stream of ever decreasing pressure, and then said decreasing area of said flow front causing said gas stream to contract, thereby gradually returning its pressure to the ambient atmospheric pressure and blanketing the remaining portion of said upper surface with said gas stream of gradually-increasing-to-atmospheric pressure;

(h) the space immediately above said upper surface forming a lower-than-atmospheric pressure zone, thus generating a force acting on said body by virtue of the balance of pressure against said body.

2. An aerodynamic force-producing apparatus according to claim 1, wherein said upper surface is substantially radially symmetrical with respect to an axis along said up direction, with said first periphery being the rim of a center opening and said second periphery being its outer periphery, thereby contributing an increasing length of said lower boundary line, and said nozzle means is disposed at said center opening with an annular mouth.

3. An aerodynamic force-producing apparatus according to claim 2, wherein said upper surface is substantially circular.

4. An aerodynamic force-producing apparatus according to claim 1, wherein said upper surface has a convex curvature, thereby contributing an increasing length of said thickness.

5. An aerodynamic force-producing apparatus with the associated force direction defined as the up direction, comprising:

(a) a body having an upper surface with respect to said up direction, said upper surface dividing into a multitude of consecutive stages, each said stage having a predetermined geometry, a first periphery and a second periphery respectively;

(b) convergent-divergent nozzle means disposed atop and along each said first periphery of respective said stage of said upper surface for blowing a supersonic gas stream across said upper surface and together with said geometry of respective said upper surface for causing respective said gas stream to flow contiguously and without obstruction along respective said upper surface toward said second periphery of respective said stage;

(c) compressor means for imparting high pressure to a gas defined as working substance which constitutes a substantial part of each said gas stream;

(d) working substance recycling means to collect and prepare for re-use the gas of each said gas stream, comprising inlet means disposed along each said second periphery of respective said stage and protruding a predetermined height to receive respective said gas stream, and conduit means for connecting each said inlet means to said compressor means and said compressor means to each said nozzle means;

(e) each said gas stream having a flow front bounded at one side by said upper surface and at the other side by the atmosphere, thereby defining the upper and lower boundary lines of each said flow front as the intersection lines between said flow front and said upper and lower boundaries respectively and defining the thickness of each said flow front as the distance between said two boundary lines;

(f) each said flow front first having an increasing area and then having a decreasing area, said increasing area being caused by the increasing lengths of at least one of said lower boundary line and said thickness of said flow front due to said geometry of respective said upper surface, and said decreasing area being caused by the decreasing length of said thickness of said flow front due to atmospheric push;

(g) said increasing area of each said flow front causing respective said gas stream to expand aerodynamically, thereby reducing its pressure and blanketing a first portion of respective said upper surface with said gas stream of ever decreasing pressure, and then said decreasing area of said flow front causing said gas stream to contract, thereby gradually returning its pressure to the ambient atmospheric pressure and blanketing the remaining portion of respective said upper surface with said gas stream of gradually-increasing-to-atmospheric pressure, whereby the space immediately above respective said upper surface forming a lower-than-atmospheric pressure zone;

(h) the combined lower-than-atmospheric pressure zones above all said stages of said upper surface generating a force acting on said body by virtue of the balance of pressures against said body.

6. A method for aerodynamically producing a force to a body with the associated force direction defined as the up direction, said body having an upper surface with respect to said up direction, said upper surface dividing into a multitude of consecutive stages, each said stage having a predetermined geometry, a first periphery and a second periphery respectively, said method comprising the steps of:

(a) providing convergent-divergent nozzle means disposed atop and along each said first periphery of respective said stage of said upper surface for blowing supersonic gas streams across said upper surface and together with said geometry of respective said upper surface for causing each said gas stream to flow contiguously and without obstruction along respective said upper surface toward said second periphery of respective said stage;

(b) providing compressor means for imparting high pressure to a gas defined as working substance which constitutes a substantial part of each said gas stream;

(c) providing working substance recycling means to collect and prepare for re-use the gas of each said gas stream, comprising inlet means disposed along said second periphery of each said stage and protruding a predetermined height to receive respective said gas stream, and conduit means for connecting each said inlet means to said compressor means and said compressor means to each said nozzle means;

(d) each said gas stream having a flow front bounded at one side by said upper surface and at the other side by the atmosphere, thereby defining the upper and lower boundary lines of respective said flow front as the intersection lines between said flow front and said upper and lower boundaries respectively and defining the thickness of each said flow front as the distance between said two boundary lines;

(e) each said flow front first having an increasing area and then having a decreasing area, said increasing area being caused by the increasing lengths of at least one of said lower boundary line and said thickness of respective said flow front due to said geometry of respective said upper surface, and said decreasing area being caused by the decreasing length of said thickness of respective said flow front due to atmospheric push;

(f) said increasing area of each said flow front causing respective said gas stream to expand aerodynamically, thereby reducing its pressure and blanketing a first portion of respective said upper surface with said gas stream of ever decreasing pressure, and then said decreasing area of respective said flow front causing respective said gas stream to contract, thereby gradually returning its pressure to the ambient atmospheric pressure and blanketing the remaining portion of respective said upper surface with said gas stream of gradually-increasing-to-atmospheric pressure, whereby the space immediately above respective said upper surface forming a lower-than-atmospheric pressure zone;

(g) the combined lower-than-atmospheric pressure zones above all said stages of said upper surface generating a force acting on said body by virtue of the balance of pressures against said body.

* * * * *